United States Patent

[11] 3,565,455

| [72] | Inventor | James M. Kostas |
| | | 418 W. Hudson St., Peoria, Ill. 61604 |
| [21] | Appl. No. | 779,724 |
| [22] | Filed | Nov. 29, 1968 |
| [45] | Patented | Feb. 23, 1971 |

[54] VEHICLE STRUT TYPE SUSPENSION WITH STABILIZED TOE-IN ANGLE
1 Claim, 5 Drawing Figs.

[52] U.S. Cl. .................................................. 280/96.2
[51] Int. Cl. .................................................. B60g 3/00
[50] Field of Search .................................. 280/96.2, 124 (F), 124 (1), 106.5; 267/60, 64, 65, 34; 180/79 (A)

[56] References Cited
UNITED STATES PATENTS
2,508,057   5/1950   Bishop.......................... (180/79.2UX)

| 2,756,070 | 7/1956 | Torre ............................ | 280/276 |
| 2,914,337 | 11/1959 | Kress............................ | 280/96.2 |
| 3,341,220 | 9/1967 | Kress............................ | 280/106.5 |

FOREIGN PATENTS

| 511,462 | 7/1955 | Italy ............................. | 280/96.2 |

Primary Examiner—Kenneth H. Betts
Attorney—Fryer, Tjensvold, Feix, Phillips and Lempio ABSTRACT: A linkage used with vehicle wheels individually mounted on vertically adjustable struts to prevent toe-in or angular movement of the wheels as a result of vertical extension and retraction of the strut. This is accomplished by the use of links which permit vertical movement of the wheels relative to the vehicle frame and having steering means connecting the wheels to the frame but fixed against vertical movement.

PATENTED FEB 23 1971

INVENTORS
JAMES M. KOSTAS

BY
Fryer, Tjensvold, Feix, Phillips & Lempio
ATTORNEYS

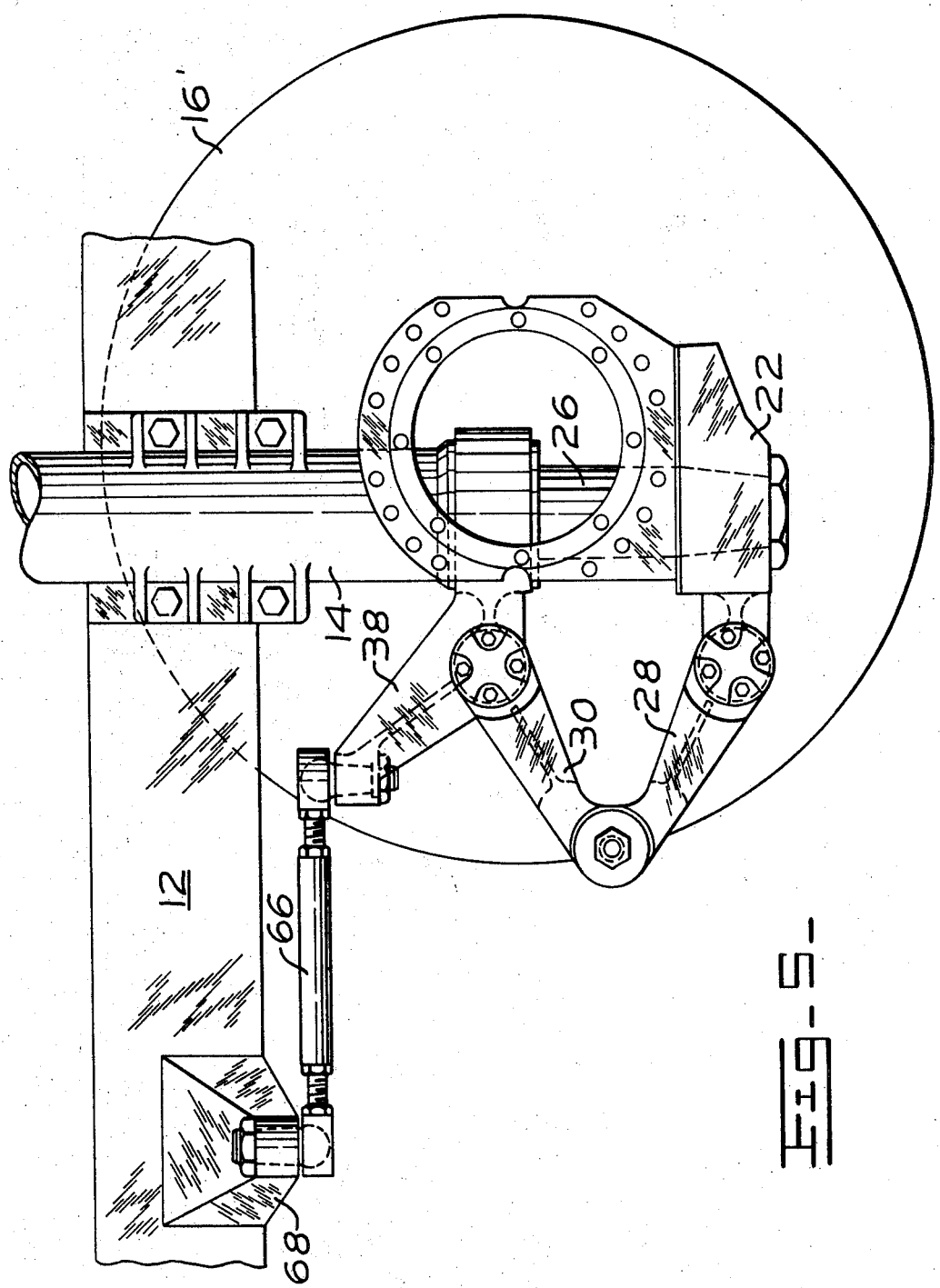

VEHICLE STRUT TYPE SUSPENSION WITH STABILIZED TOE-IN ANGLE

A suspension strut of the air over oil type for a vehicle wheel is shown and described in by assignee's U.S. Pat. to Ralph H. Kress No. 3,341,220. In the disclosure of that patent, a vertical cylinder is secured to a vehicle frame, a piston extends downwardly from the cylinder and a wheel is secured to the lower end of the piston. Vertical movement of the wheel is cushioned by air or gas in the cylinder. Since the piston is rotatable as well as reciprocable in the cylinder, steering can and has been accomplished by steering means supported on the frame and including a link extending to a steering arm affixed to the piston. Bearing in mind that one end of the link is carried by the frame and the other by the steering arm which is moved with the wheel, it is evident that the steering link swings upwardly and downwardly during vehicle travel. Its steering arm end thus moves through an arc. This varies the effective length of the link and causes unintended steering so that the wheel does not maintain its proper alignment or toe-in and excessive tire wear takes place due to scrubbing action between the tire and the road.

It is to the correction of the above-noted disadvantages of the steering mechanism described that the present invention is directed. A more complete understanding of the invention and the manner in which it is carried into practice will be gained from the following specification wherein reference is made to the accompanying drawings.

In the drawings:

FIG. 5 is a view in side elevation of suspension means like that shown in FIG. 1 with the parts oriented differently for use on a nonsteerable wheel.

Figure 1:
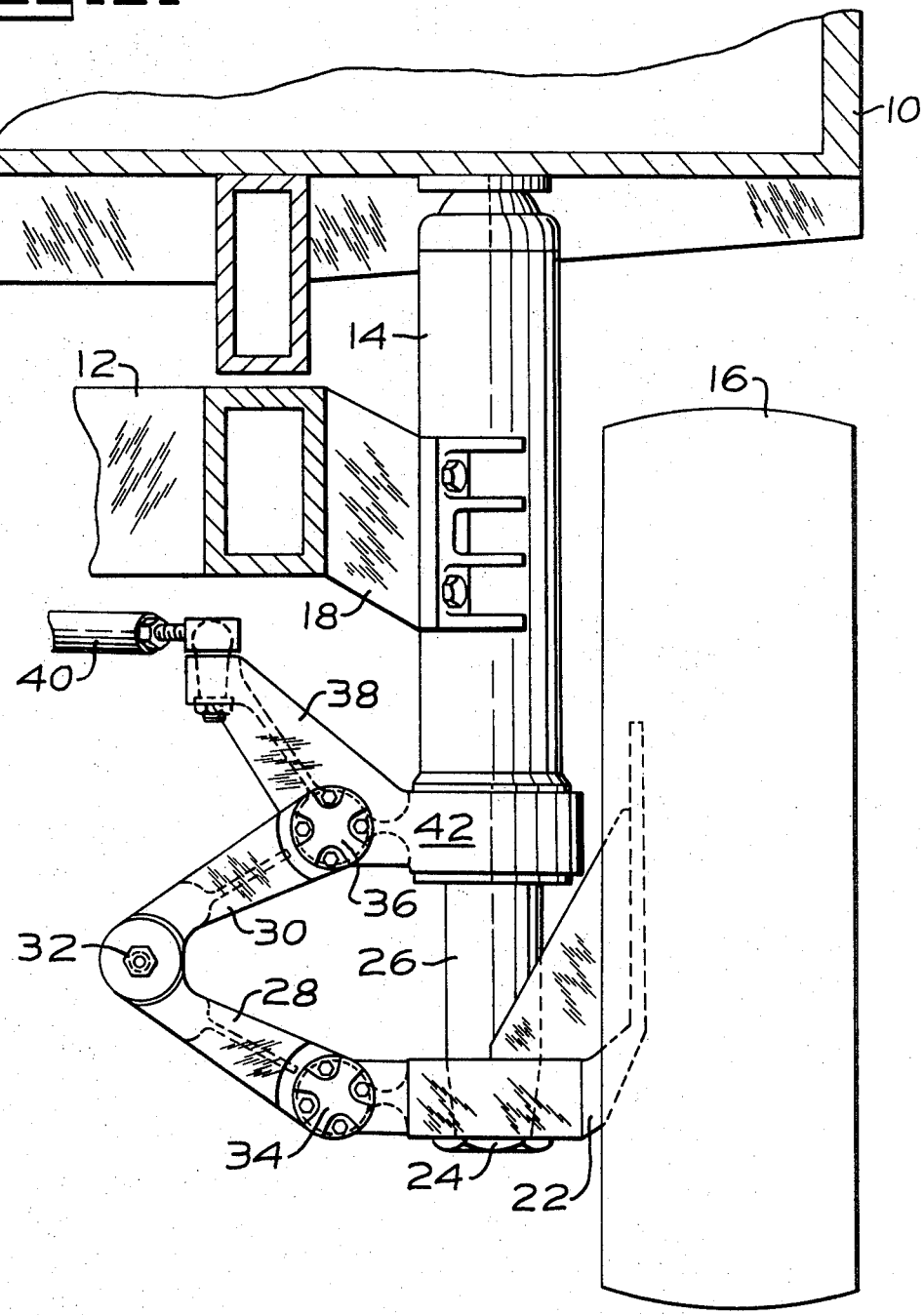
FIG. 1 shows a truck wheel in end elevation with a portion of the truck supported by it shown in transverse section, the wheel being supported by a resilient strut and including guiding and steering means of the present invention.

In FIG. 1, a portion of a truck body is shown at 10 as disposed above a main frame 12 and supported by the cylinder 14 of a wheel strut for a wheel 16. In this construction, which is disclosed in the Ralph H. Kress patent referred to above, the strut is secured to the frame 12 by a bracket 18 for retaining it in position, but the weight of the body 10 and its load are imposed directly upon the upper end of the strut. The wheel 16 is secured for rotation about an axle, shown at 20 in FIG. 2 on a wheel spindle 22. The wheel spindle is secured by a tapered connection and a screw 24 to the bottom end of a piston 26 which is reciprocably mounted in the cylinder 14 of the strut and cushioned by a volume of gas or air within the cylinder in a well-known manner.

The wheel 16 is dirigible by reason of the ability of the piston 26 to rotate within the strut cylinder 14 and is held against uncontrolled rotation or steering movement by means of a pair of links 28 and 30 pivoted to each other as by a pin 32 and pivoted relative to the wheel spindle and the strut cylinder 14 respectively at 34 and 36. A steering arm 38 is employed in association with steering linkage, including drag link a part of which is shown at 40. Rectilinear movement of the drag link imparts movement of the links 28 and 30 as well as the wheel spindle and wheel about the axis of the piston 26 to cause steering of the vehicle.

In previously known steering structures, the steering arm 38 generally has been connected directly with the wheel spindle 22 to cause rotation of the piston 26 and steering of the wheel 16. In such construction vertical movement of the wheel 16, in passing over rough terrain or variation in vertical position caused by loading of the body, caused raising and lowering movement of the end of the drag link connected to the steering arm 38. Since the opposite end of the drag link is fixed vertically with respect to the vehicle frame, being attached to a frame mounted steering mechanism, the end of the steering arm 38 moved in an arcuate path due to variation in the effective length of the drag link as the vertical position of the wheel changed. Thus, swinging of the arm 38 resulted in slight undesirable steering of the wheel 16 causing it to vary from its intended path and its preselected toe-in position.

Figure 2:
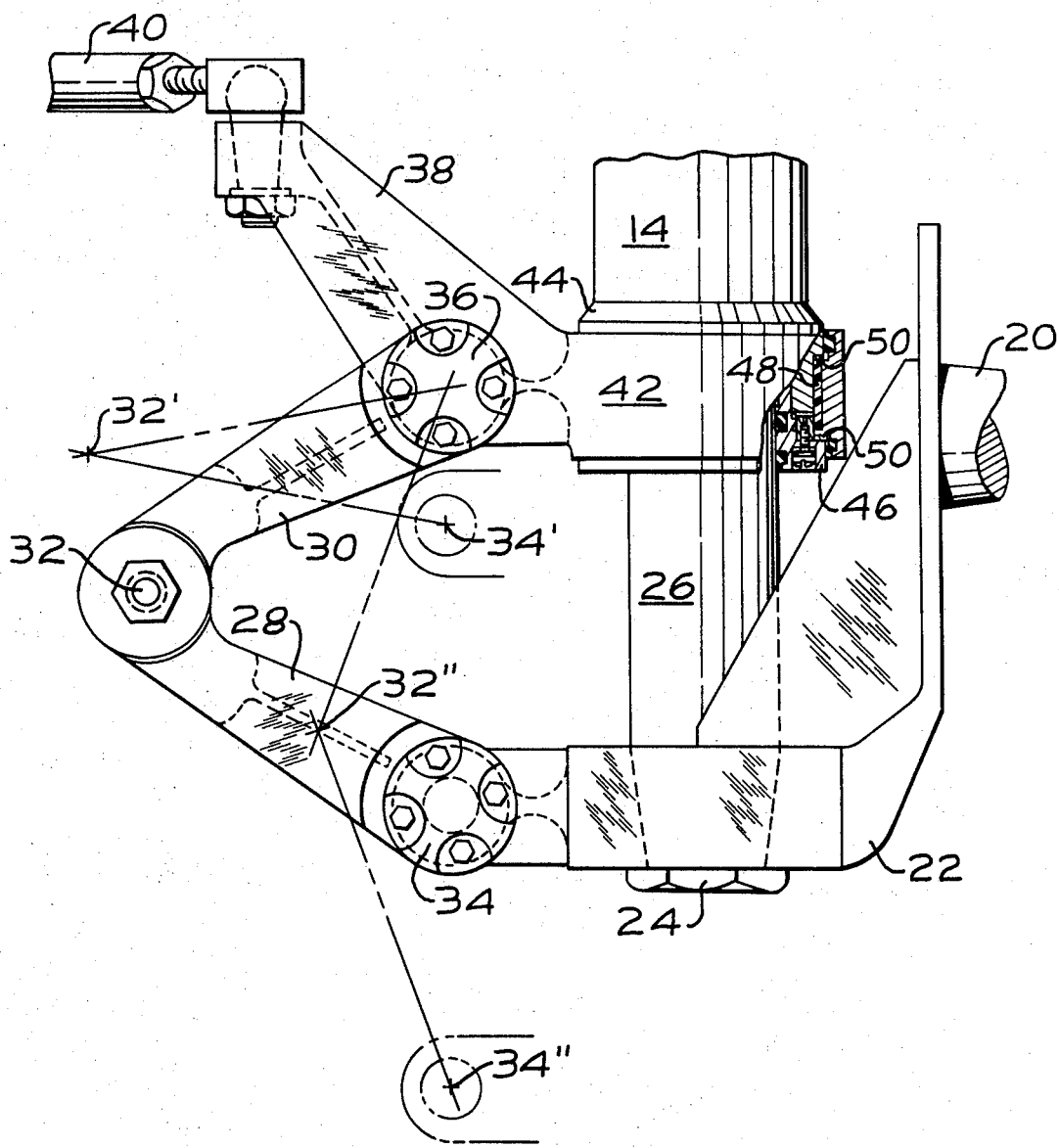
FIG. 2 is an enlarged view of a guiding and steering means shown in FIG. 1 with parts shown in section and different positions of the parts schematically illustrated.

The above-described disadvantage of the steering of strut suspended wheels is overcome in the present invention by supporting the steering arm by means which prevents it from moving vertically with respect to the frame of the vehicle which carries the steering mechanism and drag link. As shown in FIGS. 1 and 2, the arm 38 is formed as an integral part of a ring 42 which rotatably embraces the lower end of the strut cylinder 14. It is held against upward movement by a shoulder 44 on the cylinder as shown in FIG. 2 and a ring 46 is secured as by screws to the bottom of the cylinder. A bearing sleeve 48 and thrust bearings 50 enable free angular movement of the ring 42 and suitable seals retain lubricant in its vicinity.

Figure 3:
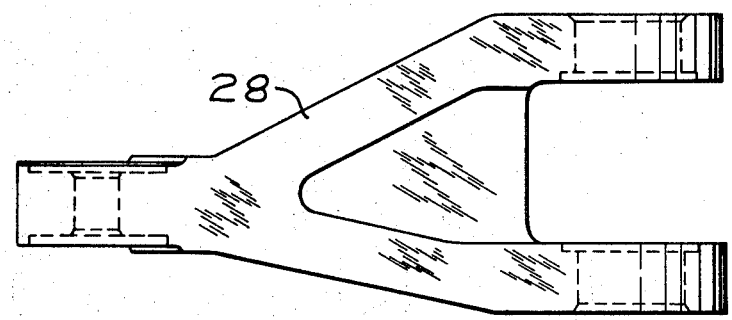
FIG. 3 is a plan view of one of a pair of pivoted lever arms.
Figure 4:
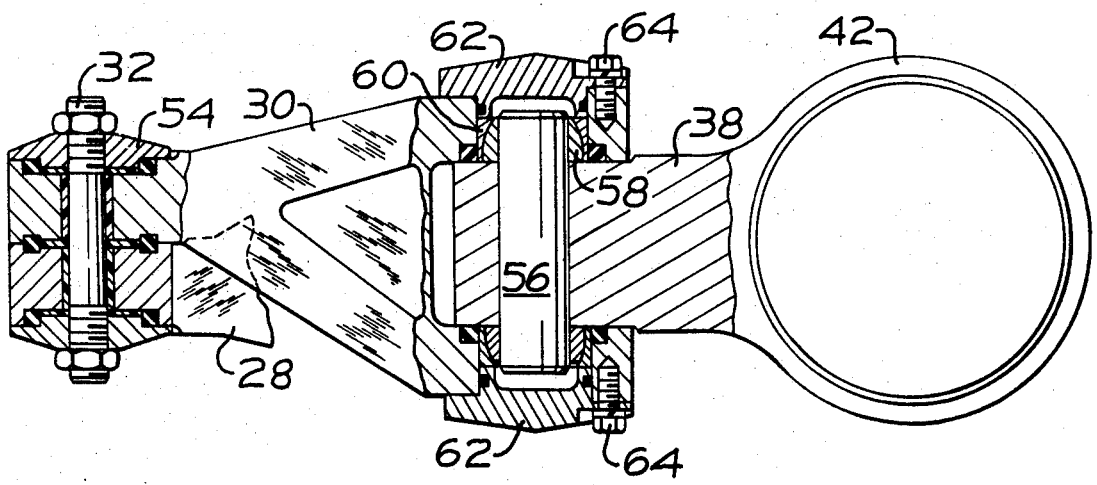
FIG. 4 is a plan view of portions of the two lever arms with parts shown in section.

The allowable range of vertical movement of the piston 26 is schematically illustrated in FIG. 2 wherein the uppermost position of the pivot 34 is shown at 34' and the lowermost position at 34". This moves the pivot 32 between positions 32' and 32". The link 28 is shown alone in FIG. 3 and the links 28 and 30 are shown in their assembled positions in FIG. 4 with parts in section better to illustrate their pivotal connections. In this FIG., the pin 32 is shown as extending through both links and end caps 54 for retaining in assembly conventional bearing sleeves, thrust members and seals all as illustrated. The upper end of the link 30 is shown as pivoted to the steering arm, a part of which is shown at 38, by a pin 56. The pin 56 is pressed into a suitable bore extending through the steering arm 38 and has semispherical bearing members 58 and 60 enabling free angular movement of the lever 30 with respect to the arm 38. End caps 62 are held in place by cap screws, shown at 64, and suitable seals, as illustrated, retain lubricant in the vicinity of the bearing surfaces. The lower pivot shown at 34 in FIGS. 1 and 2 is substantially the same as that just described.

A modified suspension is shown for a nondirigible wheel in FIG. 5 which shows the strut assembly in side elevation with the wheel removed, the wheel at the opposite side of the vehicle being represented at 16'. In this case the steering arm 38 is not used for steering purposes, but it is connected as by an adjustable link 66 with a bracket 68 secured to the frame 12. Since the link 66 extends between its connection with the bracket and the arm 38, adjustment of its length adjusts the angular disposition or toe-in of the wheel and maintains this toe-in constant irrespective of vertical movement of the wheel and angular movement of the levers 28 and 30, which levers also serve to prevent misalignment of the wheel.

I claim:

1. In a multiwheel vehicle of the kind in which each wheel is suspended from the vehicle frame by an extensible oleo-pneumatic strut and wherein some of the wheels are steerable and some of the wheels are not steerable, linkage means for maintaining a preselected toe-in of both the steerable and nonsteerable wheels to minimize tire scuffing when the struts change length, said linkage means including scissors links and drag linkage at each wheel, said scissors links being pin joint connected together at one end with the other ends of the scissor linkage being pin joint connected to the part of the strut connected to the wheel and to the part of the strut connected to the frame respectively, and said drag linkage being swivel joint connected to the part of the strut connected to the frame, whereby both the steerable and nonsteerable wheels can move up and down on strut construction and extension without moving arcuately with respect to the frame.

UNITED STATES PATENT OFFICE
CERTIFICATE OF CORRECTION

Patent No. 3,565,455     Dated February 23, 1971

Inventor(s) James M. Kostas

It is certified that error appears in the above-identified patent and that said Letters Patent are hereby corrected as shown below:

On the Title Page, after line 5, insert

-- [73] assignor to Caterpillar Tractor Co., Peoria, Ill., a corporation of California --.

Signed and sealed this 8th day of June 1971.

(SEAL)
Attest:

EDWARD M. FLETCHER, JR.
Attesting Officer

WILLIAM E. SCHUYLER, JR
Commissioner of Patents